United States Patent
Gillman

(10) Patent No.: US 10,155,363 B2
(45) Date of Patent: *Dec. 18, 2018

(54) HIGH IMPACT AND LOAD BEARING BUILDING PANEL

(71) Applicant: Jerry Gillman, Miami, FL (US)

(72) Inventor: Jerry Gillman, Miami, FL (US)

( * ) Notice: Subject to any disclaimer, the term of this patent is extended or adjusted under 35 U.S.C. 154(b) by 402 days.

This patent is subject to a terminal disclaimer.

(21) Appl. No.: 14/947,547

(22) Filed: Nov. 20, 2015

(65) Prior Publication Data

US 2016/0076248 A1 Mar. 17, 2016

Related U.S. Application Data

(63) Continuation-in-part of application No. 14/630,193, filed on Feb. 24, 2015, now Pat. No. 9,724,874, which
(Continued)

(51) Int. Cl.
*B32B 27/06* (2006.01)
*B32B 5/18* (2006.01)
(Continued)

(52) U.S. Cl.
CPC ............ *B32B 27/065* (2013.01); *B32B 5/16* (2013.01); *B32B 5/18* (2013.01); *B32B 7/12* (2013.01); *B32B 13/045* (2013.01); *B32B 13/047* (2013.01); *B32B 13/12* (2013.01); *B32B 27/14* (2013.01); *B32B 27/42* (2013.01); *E04C 2/284* (2013.01); *B32B 3/06* (2013.01); *B32B 2264/0235* (2013.01); *B32B 2266/0228* (2013.01); *B32B 2266/08* (2013.01); *B32B 2307/304* (2013.01); *B32B 2307/3065* (2013.01); *B32B 2307/50* (2013.01); *B32B 2307/558* (2013.01); *B32B 2307/56* (2013.01); *B32B 2307/712* (2013.01); *B32B 2307/714* (2013.01); *B32B 2307/718* (2013.01); *B32B 2315/00* (2013.01); *B32B 2419/00* (2013.01);
(Continued)

(58) Field of Classification Search
CPC ... E04C 2/284; E04C 2/296; B32B 2305/022; B32B 2325/00; B32B 2307/3065; B32B 2307/558; B32B 27/02
See application file for complete search history.

(56) References Cited

U.S. PATENT DOCUMENTS 3,646,715 A * 3/1972 Pope .................. B29C 44/1233
156/71
4,833,855 A * 5/1989 Winter, IV ............. E04C 2/288
52/591.4
(Continued)

*Primary Examiner* — Scott W Dodds

(57) ABSTRACT

A high impact and load bearing building panel includes a first magnesium oxide board, a phenolic resin sheet, an expanded polystyrene layer, and a second magnesium oxide board. The phenolic resin sheet is laminated with the expanded polystyrene layer, and the first magnesium oxide board is laminated with the phenolic resin sheet opposite of the expanded polystyrene layer. The second magnesium oxide board is laminated with the expanded polystyrene layer opposite of the phenolic resin sheet. The high impact and load bearing building panel is used for building construction to construct exterior walls, interior walls, roofs, floors, and foundation systems.

3 Claims, 4 Drawing Sheets

Related U.S. Application Data is a continuation of application No. 14/179,445, filed on Feb. 12, 2014, now Pat. No. 9,222,259.

(60) Provisional application No. 61/943,578, filed on Feb. 24, 2014.

(51) Int. Cl.
| | |
|---|---|
| *B32B 27/42* | (2006.01) |
| *B32B 5/16* | (2006.01) |
| *B32B 7/12* | (2006.01) |
| *B32B 13/04* | (2006.01) |
| *B32B 13/12* | (2006.01) |
| *B32B 27/14* | (2006.01) |
| *E04C 2/284* | (2006.01) |
| *B32B 3/06* | (2006.01) |
| *E04C 2/00* | (2006.01) |

(52) U.S. Cl.
CPC ....... *B32B 2419/06* (2013.01); *B32B 2471/00* (2013.01); *B32B 2607/00* (2013.01); *E04C 2002/004* (2013.01)

(56) References Cited

U.S. PATENT DOCUMENTS

| | | | | |
|---|---|---|---|---|
| 4,907,383 A | * | 3/1990 | Winter, IV | E04C 2/288 |
| | | | | 52/309.9 |
| 2009/0205277 A1 | * | 8/2009 | Gibson | E04B 7/22 |
| | | | | 52/309.9 |
| 2011/0268916 A1 | * | 11/2011 | Pardue, Jr. | B32B 3/12 |
| | | | | 428/116 |

\* cited by examiner

HIGH IMPACT AND LOAD BEARING BUILDING PANEL

This application is a continuation of U.S. patent application Ser. No. 14/179,445 filed on Feb. 12, 2014 which claims the benefit of the U.S. Provisional Patent application No. 61/763,617 filed on Feb. 12, 2013, the U.S. Provisional Patent application No. 61/773,475 filed on Mar. 6, 2013, and the U.S. Provisional Patent application No. 61/773,489 filed on Mar. 6, 2013. This application is further a continuation in part of U.S. patent application Ser. No. 14/630,193 filed Feb. 24, 2015 which claims the benefit of U.S. Provisional Patent Application No. 61/943,578 filed Feb. 24, 2014.

FIELD OF THE INVENTION

The present invention relates generally to a structural insulated panel. More specifically, the present invention is a high impact and load bearing structural insulated building panel that is used for constructing interior walls, exterior walls, floors, and roofs of a building structure.

BACKGROUND OF THE INVENTION

Structural insulated panels are composite building material of an insulating layer of rigid polymer foam sandwiched between two layers of structural board. These structural boards can consist of material such as sheet metal, plywood, particle board, etc while the insulating layer of rigid polymer foam is commonly expanded polystyrene foam, extruded polystyrene foam, polyisocyanurate foam, or polyurethane foam. The structural insulated panels can be used within many different construction applications, such as exterior walls, interior walls, roofs, floors, and foundation systems since the structural insulated panels combine the functionality of the conventional building components, such as studs, joists, insulation, vapor barrier, and air barrier. The main drawback of the structural insulated panels is that the conventional structural boards used within the structural insulated panels creep and deformed overtime due to load bearings and environmental conditions, resulting structural failure within the overall building.

It is therefore an object of the present invention to provide a load bearing and high impact insulating building panel that utilizes magnesium oxide boards bonded to a high density expanded polystyrene foam core. Due to the components and their configurations, the present invention provides an improved structural insulated panel that has superior impact and fire resistance compared to any other conventional structural insulated panel.

DETAIL DESCRIPTIONS OF THE INVENTION

Figure 1:
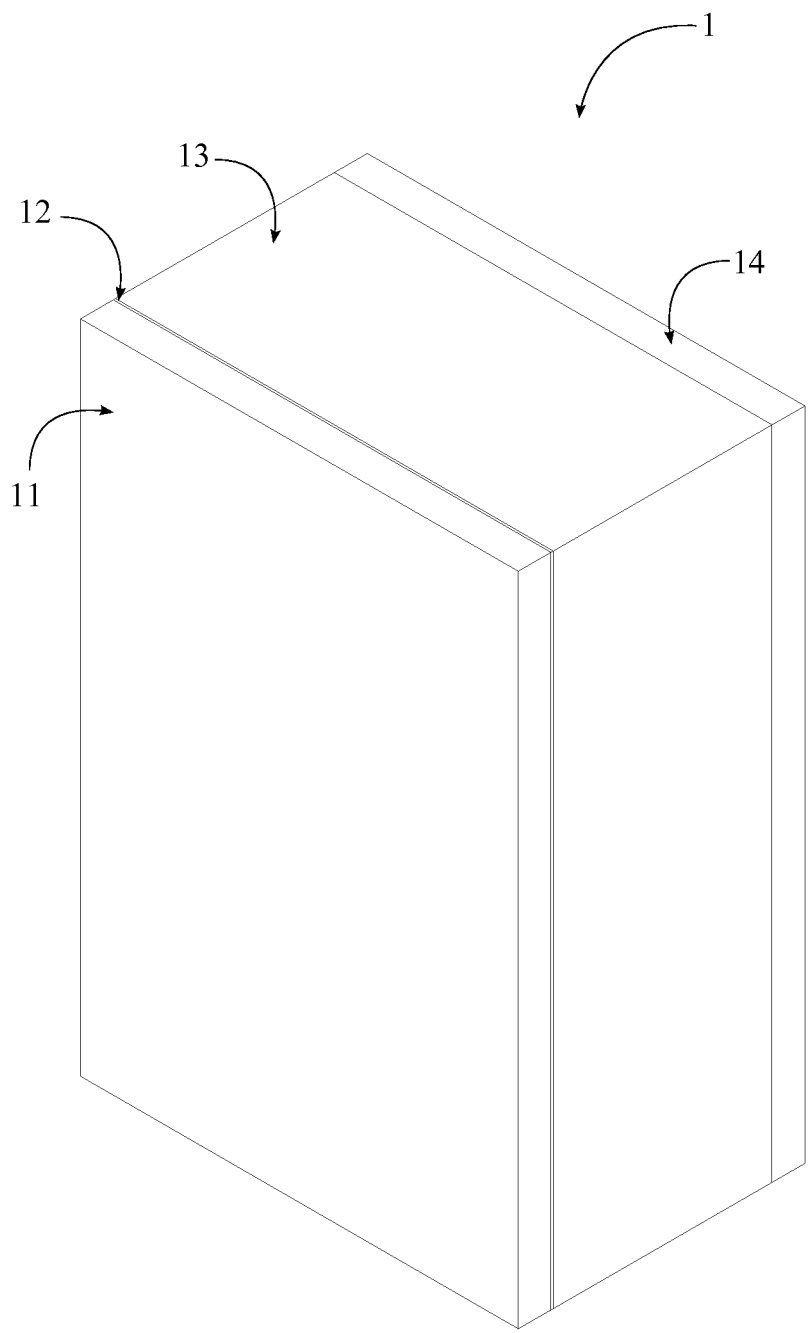
FIG. 1 is a perspective view of the present invention.

All illustrations of the drawings are for the purpose of describing selected versions of the present invention and are not intended to limit the scope of the present invention.

The present invention is a high impact and load bearing building panel 1 that replaces the conventional structural insulated panel in the building constructions. The present invention is used for constructing the exterior walls, interior walls, roofs, floors, and foundation systems of a building structure. The present invention comprises a first magnesium oxide board 11, a phenolic resin sheet 12, an expanded polystyrene layer 13, and a second magnesium oxide board 14.

Figure 2:
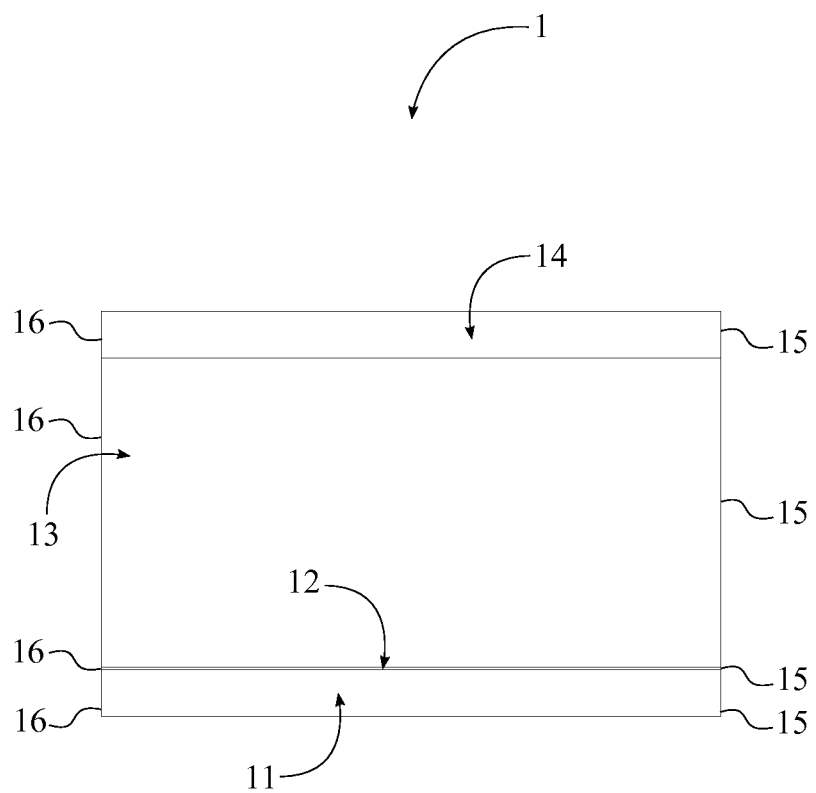
FIG. 2 is a top view of the present invention, showing the first and second edges.
Figure 3:
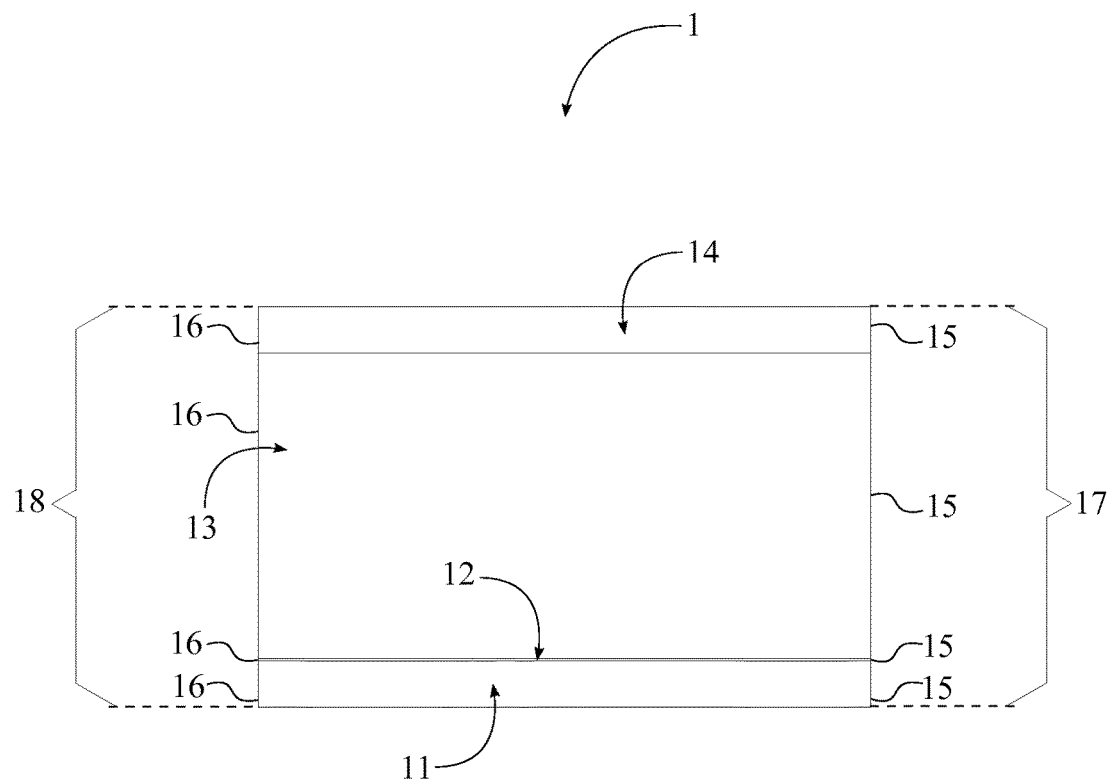
FIG. 3 is a side view of the present invention, showing the first edge, second edge, first flat surface, and the second flat surface.

In reference to FIG. 1-FIG. 3, the phenolic resin sheet 12 is adjacently laminated with the expanded polystyrene layer 13 as the phenolic resin sheet 12 improves the fire resistance within the present invention while providing superior impact absorbance to the present invention. The phenolic resin sheet 12 is a lightweight and chemical resistance material, wherein those materialistic properties of the phenolic resin sheet 12 improve the overall functionality of the present invention. The expanded polystyrene layer 13 is a thermoplastic, closed-cell, lightweight, and rigid-foam material, where the expanded polystyrene layer 13 provides low thermal conductivity, high compressive strength, and shock absorbing properties to the present invention.

In reference to FIG. 1-FIG. 3, the first magnesium oxide board 11 and the second magnesium oxide board 14 function as the exterior panels of the present invention. More specifically, the first magnesium oxide board 11 is adjacently laminated to the phenolic resin sheet 12 in such way that the first magnesium oxide board 11 is oppositely positioned from the expanded polystyrene layer 13. The second magnesium oxide board 14 is adjacently laminated to the expanded polystyrene layer 13, where the second magnesium oxide board 14 is oppositely positioned from the phenolic resin sheet 12. The first magnesium oxide board 11 and the second magnesium oxide board 14 provide high strength, fire resistance, mold and mildew control, and sound control functionality to the present invention. In reference to general structural construction, the first magnesium oxide board 11 is generally considered as the exterior side of the structural building while the second magnesium oxide board 14 is generally considered as the interior side of the structural building.

Since the first magnesium oxide board 11 and the phenolic resin sheet 12 are laminated to each other, the phenolic resin sheet 12 converts the brittleness of the first magnesium oxide board 11 into high impact panel so that the present invention is able to withstand high impact forces and high stress forces. In other words, the first magnesium oxide board 11 and the phenolic resin sheet 12 form a non-brittle outer layer within the present invention. The phenolic resin sheet 12 also acts as a backing for the present invention, where the phenolic resin sheet 12 achieve increased screw pull out strengths within the present invention.

Even though the preferred embodiment of the present invention uses laminating connection method, the present invention can utilize any type of connection methods or any type adhesive materials, such as high pressure bonding, mechanical fasteners, and adhesive, to laminate the first magnesium oxide board 11, the phenolic resin sheet 12, the expanded polystyrene layer 13, and the second magnesium oxide board 14 together. Once the first magnesium oxide board 11, the phenolic resin sheet 12, the expanded polystyrene layer 13, and the second magnesium oxide board 14 are securely laminated to each other, the first magnesium oxide board 11, the phenolic resin sheet 12, the expanded polystyrene layer 13, and the second magnesium oxide board 14 function as a single rigid panel.

In reference to FIG. 3, the first magnesium oxide board 11, the phenolic resin sheet 12, the expanded polystyrene layer 13, and the second magnesium oxide board 14 each comprise a first edge 15 and a second edge 16. More specifically, the first edge 15 of the first magnesium oxide board 11, the phenolic resin sheet 12, the expanded polystyrene layer 13, and the second magnesium oxide board 14 are oppositely positioned from the second edge 16 of the first magnesium oxide board 11, the phenolic resin sheet 12, the expanded polystyrene layer 13, and the second magnesium oxide board 14. The first edge 15 of the first magnesium oxide board 11, the phenolic resin sheet 12, the expanded polystyrene layer 13, and the second magnesium oxide board 14 are coincidently positioned with each other so that the all of the first edges 15 are able to form a first flat surface 17 within the present invention. The first flat surface 17 is perpendicularly positioned with the first magnesium oxide board 11, the phenolic resin sheet 12, the expanded polystyrene layer 13, and the second magnesium oxide board 14. As a result, the first flat surface 17 extends from the first magnesium oxide board 11 to the second magnesium oxide board 14 and vice versa. Similarly, the second edge 16 of the first magnesium oxide board 11, the phenolic resin sheet 12, the expanded polystyrene layer 13, and the second magnesium oxide board 14 are coincidently positioned with each other so that the all of the second edges 16 are able to form a second flat surface 18 within the present invention. The second flat surface 18 is perpendicularly positioned with the first magnesium oxide board 11, the phenolic resin sheet 12, the expanded polystyrene layer 13, and the second magnesium oxide board 14. As a result, the second flat surface 18 extends from the first magnesium oxide board 11 to the second magnesium oxide board 14 and vice versa. Additionally, the first flat surface 17 and the second flat surface 18 are oppositely positioned of each other along the first magnesium oxide board 11, the phenolic resin sheet 12, the expanded polystyrene layer 13, and the second magnesium oxide board 14.

Figure 4:
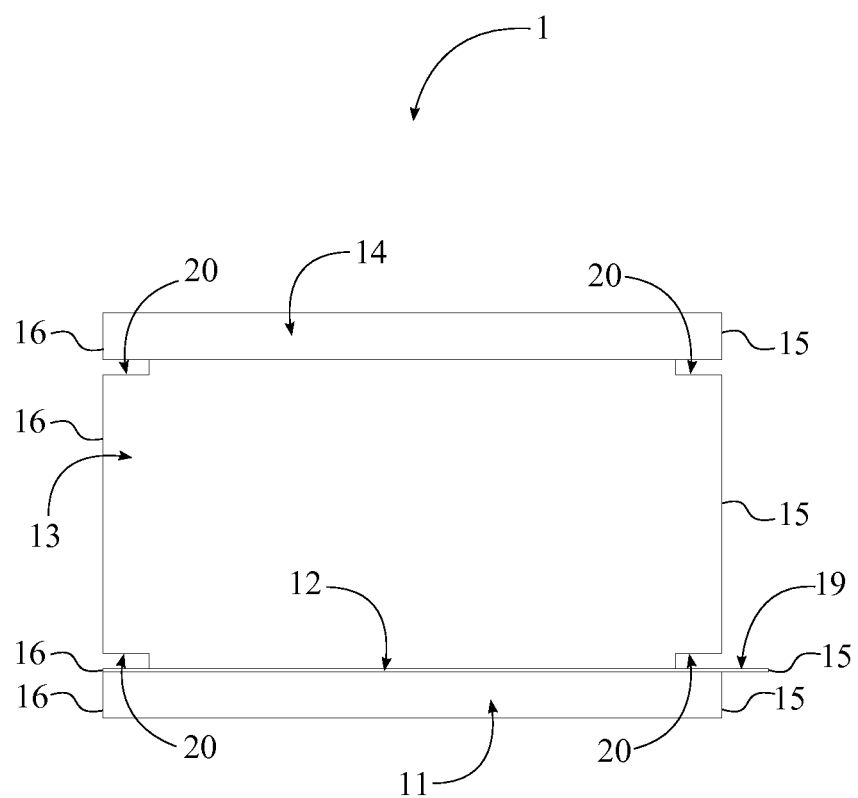
FIG. 4 is a top view of the alternative embodiment of the present invention, showing the connecting seal section and the spline-receiving grooves.

In an alternative embodiment of the present invention that is show in FIG. 4, the first edge 15 of the first magnesium oxide board 11, the phenolic resin sheet 12, the expanded polystyrene layer 13, and the second magnesium oxide board 14 are coincidently positioned with each other so that the all of the first edges 15 are able to form the first flat surface 17. However, the second edge 16 of the first magnesium oxide board 11, the expanded polystyrene layer 13, and the second magnesium oxide board 14 are coincidently positioned with each other, while, the second edge 16 of the phenolic resin sheet 12 is extended from the second edge 16 of the first magnesium oxide board 11, the expanded polystyrene layer 13, and the second magnesium oxide board 14. As a result of the offsetting phenolic resin sheet 12, a connecting seal section 19 can be formed within the present invention.

In another alternative embodiment of the present invention, the present invention comprises a plurality of spline-receiving groove 20 that traverses into the expanded polystyrene layer as each spline-receiving groove 20 is positioned at each corner of the expanded polystyrene layer. More specifically, the spline-receiving groove 20 comprises a first spline-receiving groove, a second spline-receiving groove, a third spline-receiving groove, and a fourth spline-receiving groove. The first spline-receiving groove, the second spline-receiving groove, the third spline-receiving groove, and the fourth spline-receiving groove are adjacently positioned with the first edge 15 and the second edge 16 of the present invention. More specifically, the first spline-receiving groove, the second spline-receiving groove, the third spline-receiving groove, and the fourth spline-receiving groove are traversed into the expanded polystyrene layer 13. The first spline-receiving groove and the second spline-receiving groove are adjacently positioned with the first magnesium oxide board 11, where the first spline-receiving groove and the second spline-receiving groove are oppositely positioned from each other and positioned parallel to each other. The third spline-receiving groove and the fourth spline-receiving groove are adjacently positioned with the second magnesium oxide board 14, where the third spline-receiving groove and the fourth spline-receiving groove are oppositely positioned from each other and positioned parallel to each other. Additionally, the first spline-receiving groove and the third spline-receiving groove are coincidently positioned with each other adjacent to the first edge 15, and the second spline-receiving groove and the fourth spline-receiving groove are coincidently positioned with each other adjacent to the second edge 16.

The attachment between the plurality of high impact and load bearing building panels 1 is explained in relation to an arbitrary high impact and load bearing building panel (HILBBP) and a subsequence high impact and load bearing building panel (HILBBP). In order to efficiently attach the arbitrary HILBBP and the subsequence HILBBP together, the present invention utilizes the connecting seal section 19, a first connecting spline, and a second connecting spline. The first connecting spline and the second connecting spline each comprises a magnesium oxide board section and a phenolic resin sheet section as the magnesium oxide board section and the phenolic resin sheet section are adjacently laminated to each other. When the arbitrary HILBBP and the subsequence HILBBP are adjacently placed next to each other, the connecting seal section 19 of the arbitrary HILBBP is traversed into the first spline-receiving groove of the subsequence HILBBP. The connecting seal section 19 of the arbitrary HILBBP then overlaps the first edge 15 of the phenolic resin sheet 12 for the subsequence HILBBP in such way that the connecting seal section 19 and the first edge 15 of the of the phenolic resin sheet 12 form a watertight seal. The connecting seal section 19 of the arbitrary HILBBP forms a barrier against water and moisture intrusion into the building envelope system. Once the arbitrary HILBBP and the subsequence HILBBP are positioned together, the second spline-receiving groove and the fourth spline-receiving groove of the arbitrary HILBBP are respectively positioned with the first spline-receiving groove and the third spline-receiving groove of the subsequence HILBBP. The first connecting spline traverses into the first spline-receiving groove of the subsequence HILBBP and the second spline-receiving groove of the arbitrary HILBBP in such way that the phenolic resin sheet section of the first connecting spline is adjacently positioned with the expanded polystyrene layers 13, and the magnesium oxide board section of the first connecting spline is adjacently positioned with the connecting seal section 19. The second connecting spline traverses into the third spline-receiving groove of the subsequence HILBBP and the fourth spline-receiving groove of the arbitrary HILBBP in such way that the phenolic resin sheet section of the second connecting spline is adjacently positioned with the expanded polystyrene layers 13, and the magnesium oxide board section of the second connecting spline is adjacently positioned with the second magnesium oxide boards 14. A plurality of fasteners is used to attach the arbitrary HILBBP and the subsequence HILBBP during the multiple attachment of the present invention. More specifically, the plurality of fasteners is externally traversed through the first magnesium oxide boards 11 and the phenolic resin sheet 12 and into the first connecting spline so that the arbitrary HILBBP and the subsequence HILBBP can be attached to each other from the exterior side of the structural building. Similarly, the plurality of fasteners is externally traversed through the second magnesium oxide boards 14 and into the second connecting spline so that the arbitrary HILBBP and the subsequence HILBBP can be attached to each other from the interior side of the structural building.

Although the invention has been explained in relation to its preferred embodiment, it is to be understood that many other possible modifications and variations can be made without departing from the spirit and scope of the invention as hereinafter claimed.

What is claimed is:

1. A high impact and load bearing building panel comprising:
    a first magnesium oxide board;
    a phenolic resin sheet, the phenolic resin sheet providing fire resistance and impact absorbance;
    an expanded polystyrene layer;
    a second magnesium oxide board;
    an adhesive material;
    the phenolic resin sheet being adjacently laminated with the expanded polystyrene layer via the adhesive material;
    the first magnesium oxide board being adjacently laminated to the phenolic resin sheet opposite from the expanded polystyrene layer via the adhesive material;
    the second magnesium oxide board being adjacently laminated to the expanded polystyrene layer opposite from the phenolic resin sheet via the adhesive material;
    the first magnesium oxide board and the phenolic resin sheet form a non-brittle outer layer;
    the first magnesium oxide board, the phenolic resin sheet, the expanded polystyrene layer and the second magnesium oxide board each comprising a first edge and a second edge;
    the first edge of the first magnesium oxide board, the phenolic resin sheet, the expanded polystyrene layer and the second magnesium oxide board being coincidently positioned with each other to form a first flat surface;
    the second edge of the first magnesium oxide board, the expanded polystyrene layer and the second magnesium oxide board being coincidently positioned with each other; and
    the second edge of the phenolic resin sheet being extended from the second edge of the first magnesium oxide board, the expanded polystyrene layer and the second magnesium oxide board to form a connecting seal section.

2. The high impact and load bearing building panel as claimed in claim 1 comprising:
    the second edge of the first magnesium oxide board, the expanded polystyrene layer and the second magnesium oxide board being coincidently positioned with each other to form a second surface; and
    the first flat surface and the second surface being oppositely positioned of each other.

3. The high impact and load bearing building panel as claimed in claim 1 comprising:
    a plurality of spline-receiving grooves traversing into the expanded polystyrene layer, each spline-receiving groove being positioned at each corner of the expanded polystyrene layer.

* * * * *